Feb. 18, 1969

G. A. SIMMS 3,427,926

INTERRUPTED TYPE FACING MACHINE

Filed March 2, 1967

George A. Simms INVENTOR.

BY *Clarence A. O'Brien*
and *Harvey B. Jackson*
Attorneys

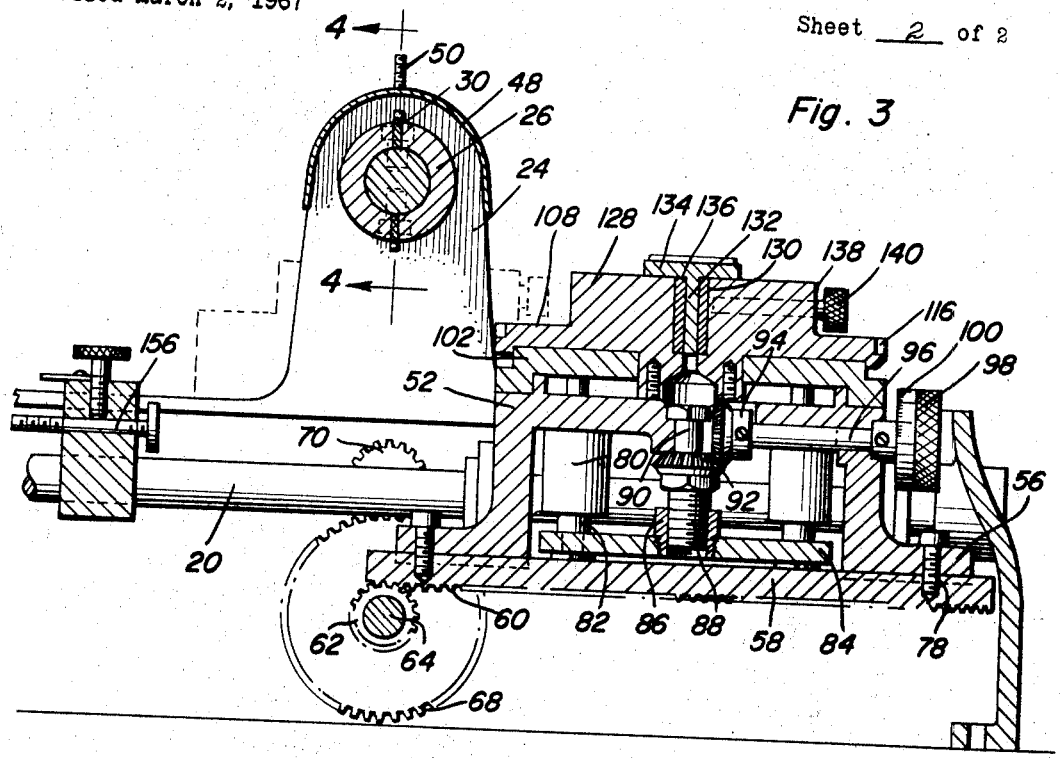
Fig. 3
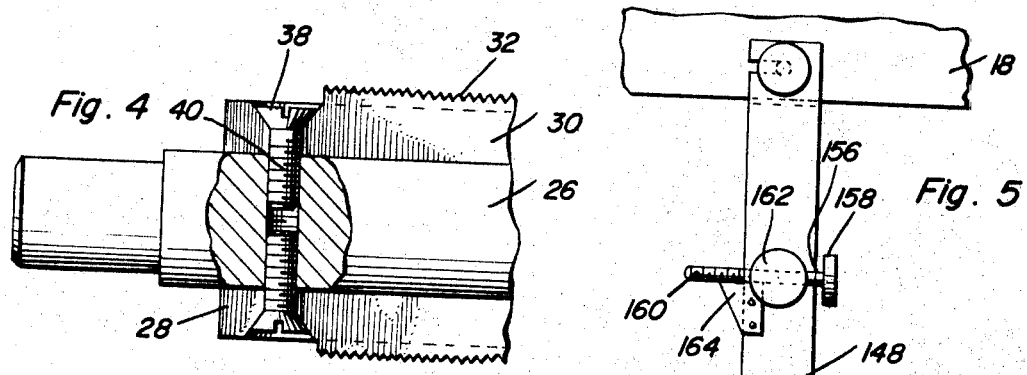
Fig. 4
Fig. 5
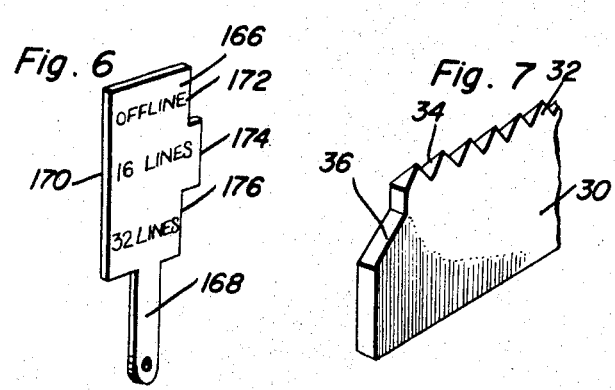
Fig. 6
Fig. 7
George A. Simms
INVENTOR.

United States Patent Office 3,427,926
Patented Feb. 18, 1969

3,427,926
INTERRUPTED TYPE FACING MACHINE
George A. Simms, 3265 Queenstown Drive,
Mount Rainier, Md. 20822
Filed Mar. 2, 1967, Ser. No. 620,133
U.S. Cl. 90—18
Int. Cl. B23c 1/00; B23p 17/04
5 Claims

ABSTRACT OF THE DISCLOSURE

A device for making interrupted type faces on a conventional type slug by forming grooves or recesses across the type face incorporating structural arrangements which enable accurate adjustment and variation in the interruptions thereby varying the configuration of the type face and the appearance characteristics of the printed work produced by the interrupted type faces produced by the device. The angular relation of the interruptions may be accurately set as well as the spatial relation of the interruptions, the width characteristics of the interruptions and the depth and length of the interruptions may also be adjusted and varied thereby enabling the characteristics of the interrupted type face to be accurately and precisely varied depending upon the requirements of the printed work.

---

The present invention generally relates to the art of printing and includes a machine or apparatus for making interrupted type faces with the structure disclosed in this application representing novel and important improvements over that disclosed in my prior Patent No. 2,506,746, patented May 9, 1950.

An object of the present invention is to provide a device for forming interruptions in a type face carried on a conventional slug in which the interruption is in the form of a groove or grooves extending across the type face in which the grooves are formed by a rotating drum having a plurality of cutters mounted thereon in which the cutters are adjustable along the axis of the drum for varying the spatial relationship of the grooves formed in the type face.

A further object of the present invention is to provide a machine in accordance with the preceding objects in which the type slug is mounted on a turntable reciprocable in relation to the rotating drum having the cutting elements thereon with there being a stop mechanism provided to vary the distance in which the type face is moved in relation to the drum so that interruptions can be made only partially across the type face to whatever degree desired.

Yet another object of the present invention is to provide a machine in accordance with the preceding object in which the turntable is also rotatable and provided with a mechanism for accurately and positively locking the turntable in adjusted angular position so that the angular orientation of the grooves or interruptions formed in the type face may be varied but accurately oriented.

Yet another important object of the present invention is to provide a machine in accordance with the preceding objects in which the type slug is positively held in position on the turntable but may be laterally moved an increment of movement to enable the type slug to be adjusted in relation to the drum having the cutters thereon to vary the characteristics of the grooves formed thereby during subsequent passes of the type face under the rotating drum.

Still another important object of the present invention is to provide a machine for forming an interrupted type face on a conventional type slug which is simple in construction, easy to use, extremely accurate, quite utilitarian in that it may be employed for forming interruptions of various characteristics and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal, sectional view taken substantially upon a plane passing along section line 3—3 of FIGURE 2 illustrating further structural details of the machine including the stop mechanism;

FIGURE 4 is an enlarged fragmental sectional view illustrating the manner of adjustably and removably supporting the cutter elements on the rotating drum or spindle;

FIGURE 5 is a plan view of the stop mechanism for the carriage to limit the degree of travel thereof thereby limiting the length of the interruptions formed across the type face;

FIGURE 6 is a perspective view illustrating a gauge mechanism employed for setting the cutter elements in the rotating drum or spindle;

FIGURE 7 is a fragmental perspective view illustrating the particular construction of one of the cutter elements.

Figure 1:
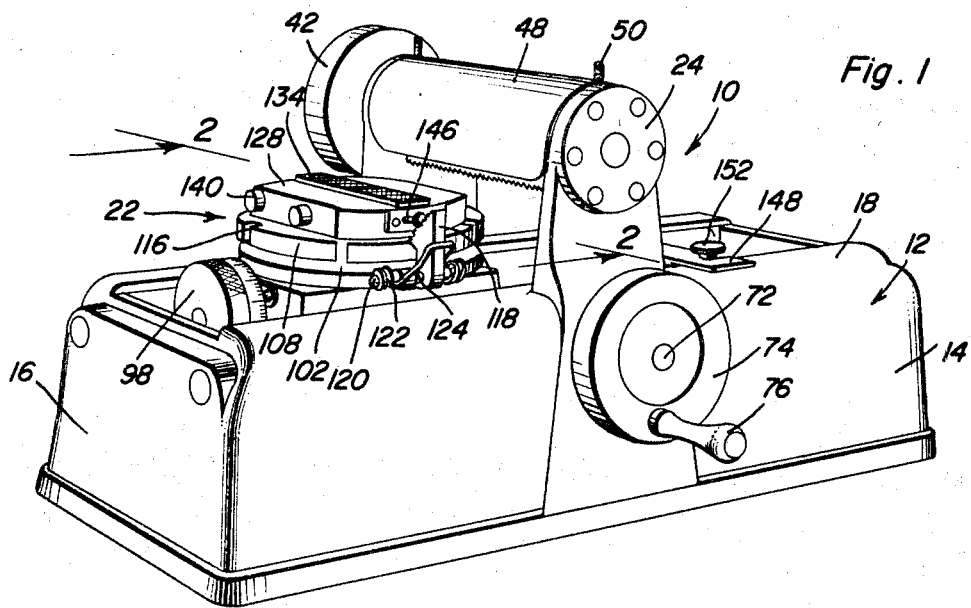
FIGURE 1 is a perspective view of the machine of the present invention.
Figure 2:
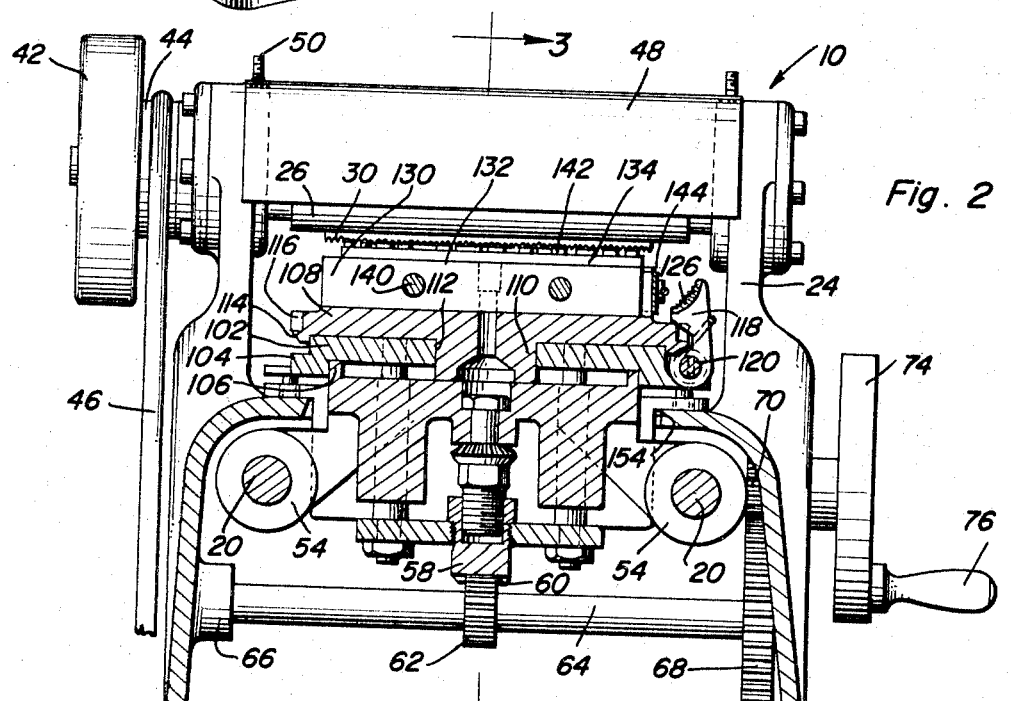
FIGURE 2 is a transverse, sectional view taken substantially upon a plane passing along section line 2—2 of FIGURE 1 illustrating the construction of the turntable and the relationship of the slugs to the rotating drum.

Referring now specifically to the drawings, the type face interrupting machine of the present invention is generally designated by the numeral 10 and includes a generally hollow base 12 having upstanding side walls 14 and upstanding end walls 16 which may incline slightly and terminate in top edges with the top edges of the side walls 14 being inturned or curved inwardly as at 18. The base 12 may be cast or otherwise formed and provided with any suitable structure for securing the machine on a work bench or the like. Mounted longitudinally in the base 12 is a pair of supporting rods 20 which are in the form of ways and are accurately positioned in parallel horizontal position for reciprocally and accurately supporting a carriage generally designated by the numeral 22.

Mounted centrally of the base 12 is a pair of upstanding supporting members or brackets 24 which may be either integral with the base 12 or fixedly secured thereto. Journalled between the upstanding supports 24 is a rotatable drum or spindle 26 having longitudinal grooves formed therein as at 28 for receiving elongated blade-like cutter elements 30. As illustrated, the two grooves 28 are disposed at diametrically disposed points on the spindle 26 for receiving two cutter elements 30. Each of the cutter elements 30 is provided with a plurality of substantially V-shaped teeth or cutting surfaces 32 in which the trailing edge thereof is relieved as at 34 to eliminate any drag on the work face in a manner described hereinafter. The outer end corners of each cutter element 30 is beveled as at 36 for engagement with the inclined inner surface of a screw head 38 on a retaining and adjustment screw 40 extending into the drum or spindle 26 so that by loosening the screw 40 at one end of a cutter element 30 and tightening the screw at the opposite end thereof, the cutter element 30 may be shifted longitudinally of the spindle or drum 26 for a purpose described hereinafter.

One end of the spindle or drum 26 is provided with a flywheel 42 and a drive pulley 44 engaged by a drive belt 46 by which the spindle or drum 26 may be caused to rotate. A generally U-shaped shield 48 is provided in overlying relation the rotatable drum or spindle 26 and the cutters 30 to protect persons from accidentally engaging the cutters and also to prevent any material picked up by the cutters from being slung or discharged upwardly. The guard or shield 48 is removably positioned over a pair of upstanding pins 50 attached to the upper ends of the upstanding supports 24 and these pins may be unthreaded or threaded for receiving a retaining clamp nut or the like. The specific details of the bearing support structure for the spindle or drum 26 have not been illustrated inasmuch as these details are conventional with it being necessary for the rotational axis of the drum or spindle 26 to be accurately maintained in relation to the position of the guide rods 20.

The carriage 22 includes a base casting or structure 52 having laterally and downwardly inclined supporting brackets 54 slidably engaged on the guide rods 20 so that the carriage 22 will be slidably supported along a horizontal plate in perpendicular relation to the rotational axis of the spindle or drum 26. The lower end of the base component 52 is provided with longitudinally extending flanges 56 which receive and are attached to an elongated rack bar 58 having rack teeth 60 thereon facing downwardly for meshing engagement with a pinion drive gear 62 carried by a transversely extending shaft 64 journalled in embossments 66 on the interior of the side walls 14 of the base 12. One end of the shaft 64 is provided with a spur gear 68 larger than the gear 62 in meshing engagement with a smaller drive pinion gear 70 disposed on the inner end of a shaft 72 interiorly of the base for driving the shaft 64 and, of course, reciprocating the carriage 22. The shaft 72 is provided with a hand wheel 74 on the outer end thereof exteriorly of the base 12 with a handle 76 being provided on the wheel 74 to provide for manual manipulation of the carriage 22 during its reciprocatory movement. Thus, as the handle 76 is moved in a circular path either in a clockwise or counterclockwise direction, the carriage 22 will be correspondingly reciprocated along the guide rods 20.

The base 52 has the rack gear 58 detachably secured thereto by suitable screw-threaded fasteners 78 or the like. Also, depending from the top plate of the base casting 52 is a plurality of vertically disposed bosses 80 having passageways extending therethrough for vertical guide rods 82 having a plate 84 connected to the lower ends thereof. The plate 84 has a centrally disposed internally threaded nut 86 secured thereto for threadedly receiving an externally threaded member 88 journalled on a shaft 90 secured to the base casting 52 of the carriage. The externally threaded member 88 is provided with a bevel spur gear 92 on the upper end thereof for meshing engagement with a bevel spur gear 94 carried by a shaft 96 journalled in the base casting 52 and extending from the end thereof remote from the spindle or drum 26 and provided with a knurled knob 98 on the end thereof for enabling rotation of the shaft 96. A graduated scale 100 is provided on the knob 98 and is associated with a suitable index line for enabling rotation of the externally threaded member 88 which due to its being rotatable but immovable insofar as longitudinal movement is concerned on the base casting 52, such rotation of the externally threaded member 88 will cause vertical movement of the plate 84 and the guide rods or pins 82 extending through the hollow bosses 80.

The upper ends of the pins or guide rods 82 are connected to a top plate 102 which has a depending flange 104 on the periphery thereof which telescopes in relation to an upstanding flange 106 on the periphery of the base casting 52 so that the top plate 102 will be accurately guided in relation to the base casing 52. Rotatably mounted on the top plate 102 is a work carrying plate 108 having a depending cylindrical projection 110 journalled in a corresponding passage or bore 112 in the top plate 102. The periphery of the work clamping plate 108 depends into engagement with the periphery of the top plate 102 at 114 and a plurality of notches 116 are provided in the periphery of the work clamping plate 108 for receiving a latching element 118 pivotally mounted on the plate 102 by a pivot shaft 120 carried by suitable brackets 122. An axial coil spring 124 is provided for urging the latch 118 into engagement with the notches 116. The top inner edge of the latching element 118 is beveled and roughened as at 126 to facilitate manual grasping of the latch 118 and pivotal movement into disengagement in relation to the notches 116. As illustrated, the notches 116 are square cut, that is, provided with parallel wall surfaces and the latch 118 is correspondingly shaped so that when the latch 118 is engaged with a notch 116, there will be no looseness nor play inasmuch as the side surfaces of the latch 118 are also parallel to each other thereby providing a high accurate and positive latching engagement between the plate 102 and the plate 108.

Figure 8:
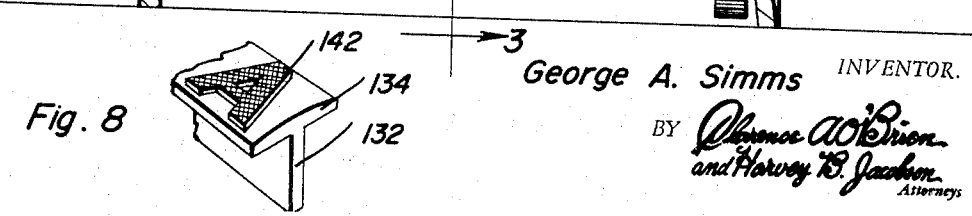
FIGURE 8 is a fragmental perspective view of a portion of a conventional type slug with the grooves formed therein by the machine of the present invention.

Integral with the plate 108 is an upward extension 128 which has a transverse groove or slot 130 formed therein for receiving the shank or mounting tongue 132 of a conventional type slug 134. Filler plates 136 are provided on each side of the shaft 132 to substantially fill the groove 130 and to prevent removal of or movement of the type slug 134. Clamp screws 138 having knurled heads 140 thereon are employed for releasably securing the type slug 134 in position. As illustrated in FIGURE 8, the type slug 134 is conventional in construction and provided with type faces 140 thereon which are to have grooves formed in the surface thereof by the cutter 30 during movement of the type faces 140 past the rotating drum or spindle 26.

One end of the slot or groove 130 which receives the shank 132 of the type slug 134 is provided with a closure plate 144 and an adjustment screw having a laterally extending handle 146 which will serve as an abutment for the slug 134 so that in one position the handle 146 will orient the slug 134 in relation to the cutter elements 30 and in the other position, that is, with the handle 146 rotated 180° to point in the direction of the rotating spindle or drum, the adjustment screw abutting the end of the slug 134 will slide the slug over one-sixty fourth of an inch for recutting 32 lines to 64 lines with it, of course, being necessary to loosen the clamp screws 140 before the adjustment screw and handle 146 can be rotated.

A transversely extending bar 148 is disposed between the inturned top edges 18 of the side walls 14 of the base 12 with the strap or bar 148 having notches 150 adjacent the ends thereof for fitting over and receiving upstanding headed pins 152 fixed rigidly to the base 12 on the inturned edges 18 of the side walls 14. The undersurface of the bar 148 is undercut at 154 to be received between the inturned edges of the side walls 14 and the center portion of the bar 148 is provided with a movable stem 156 having an abutment 158 on the end thereof and indicia 160 on the opposite end thereof with the stem being held in adjusted position by a setscrew and knob assembly 162. An indicating pointer 164 is associated with the indicia 160 on the stem 156 in order that the position of the abutment 158 may be varied so that the length of the interruption or groove formed on the type face 142 may be varied.

FIGURE 6 illustrates a gauge 166 to be employed in setting the cutting elements 30 with the gauge 166 having a handle 168 and a straight side portion 170 and generally defines a plate-like structure. This gauge is disposed with one of the gauging surfaces 172, 174, or 176 against the end edge of a cutting element 30 or in alignment therewith with the opposite edge 170 against the inner surface of the support bracket 24 at the flywheel end of the spindle thus enabling the grooves or lines to be formed 16 lines to the inch, or 32 lines to the inch and 64 lines to the inch may be obtained by first cutting 32 lines to an inch and then moving the slug over one-sixty-fourth of an inch by using the screw adjustment 146 and then recutting the type face.

As illustrated, the groove 130 in the clamping plate 128 is the same depth as the shank 132 of the slug 134 with the blank fillers or slugs 136 having the same height. This centers the type slug 134 on the clamping plate 128 so that the center of the rotating clamp plate 128 will coincide with the center of the slug 134. The cutter elements 30 have the teeth 32 thereon generally of V-shaped configuration with the clearance or incline 34 being approximately 20° thus forming V-shaped cutting points which will be quite accurate and will not produce any interference or drag during rotational movement. The stop device for the carriage or bed is manually adjusted and is manually positioned in place in that it is merely placed onto the head pins 152 and will be retained in parallel relation to the rotational axis of the cylinder or drum 26 so that it will be retained in place for repeat operation of the carriage 22.

The slot 130 which receives the type slug is one-half inch wide or thirty-six points. The lower part of the type slug shown is twelve points wide and the depth of the channel is .764 inch which is the height of the underpart or shank of the slug 134. All of the spacing slugs or material 136 is also .764 inch high thereby providing a positive support for the type slug 134 with the top portion thereof resting against the clamp 128. The cutting elements or blades 30 project from the cylinder or spindle 26 one-eighth inch and the blade is one-half inch in width and the slot is three-eighths inch deep. The total slide of the blade 30 when one screw 38 is tightened and the other one loosened with the loosening of the screw being accomplished first is only one-thirty-second of an inch. The stop gauge enables the device to be employed for cutting partly across a type face and may be set at any desired length of cut and this length of cut may be repeated as desired and may be varied by varying the position of the stop gauge abutment. The most used cut would be the arrangement at which the machine is set to cut thirty-two lines or grooves to the inch across the type face. The other cuts which require one blade to be slid longitudinally while the other blade remains stationary would be used to a much lesser degree. Also, a border rule can be cut by placing the border rule or a plurality of pieces of border rule may be simultaneously cut by placing them in the channel in lieu of the type slug. Appropriate filler plates may be employed when the slugs or border rule vary in thickness. As will be observed, the lines or grooves across the type face may be angulated to any desired degree and characteristics of the lines or grooves may be widely varied so that they are equally spaced or varied as to spacing with certain lines having wider characteristics or narrower characteristics as desired thereby enabling various types of printed work to be formed by employing the type slugs after the type faces thereof have been provided with lines or grooves employing the present machine. The present machine with its various precision set ups produces well over one hundred distinctive interrupted type faces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for producing an interrupted type face, a supporting structure for a slug mounted to move in a rectilinear path, a cutter having metal cutting teeth mounted adjacent the rectilinear path to rotate about an axis which lies transversely of and spaced from the path for cutting lines in a type face as it moves along the rectilinear path, means moving the supporting structure in said path, adjustable means associated with said supporting structure for adjusting the space between the supporting structure and the metal cutting teeth, the angular orientation of the type face and the relative longitudinal position of the type face and cutting teeth, said supporting structure including a carriage having a base member, means guiding said base member for movement in a horizontal path, and a plate mounted on said base member for vertical movement in relation thereto, means interconnecting the base member and plate for adjusting the plate vertically, a clamp plate rotatably supported on the vertically adjustable plate, and means interconnecting the clamp plate and the vertically adjustable plate for enabling adjustment of the clamp plate about a vertical axis.

2. The structure as defined in claim 1 wherein said means for adjusting the type slug includes a channel in said supporting structure therefor, an abutment screw at one end of the channel for engaging one end of the type slug whereby said abutment screw may be adjusted to move the type slug longitudinally when unclamped.

3. The structure as defined in claim 1 wherein said means for adjusting the cutting teeth includes an inclined end edge on each end of the cutter, an inclined member clampingly engaging each end edge of the cutter whereby loosening of one inclined clamping member and tightening of the other will cause longitudinal adjustment of the cutter and cutting teeth thereon.

4. The structure as defined in claim 1 wherein said cutter teeth each are substantially V-shaped and relieved from the leading edge toward the trailing edge to eliminate drag of the teeth when cutting the type face.

5. The structure as defined in claim 1 together with means limiting the movement of the supporting structure in its rectilinear path, said means including a transverse bar, a stop abutment mounted on the bar in said path for limiting movement of the supporting structure, and means adjusting the position of said abutment on said bar.

References Cited

UNITED STATES PATENTS

| 554,422 | 2/1896 | Holz | 90—18 |
| 2,506,746 | 5/1950 | Simms | 29—24 X |
| 3,203,314 | 8/1965 | Ried | 90—58 X |

ANDREW R. JUHASZ, Primary Examiner.

G. WEIDENFELD, Assistant Examiner.

U.S. Cl. X.R.

90—58; 29—24